United States Patent Office 3,457,195
Patented July 22, 1969

3,457,195
PROCESS FOR TITANYL PHOSPHINATE POLYMERS
Burton Peter Block, Wayne, and Gerd Helmut Dahl, King of Prussia, Pa., assignors to Pennsalt Chemicals Corporation, Philadelphia, Pa., a corporation of Pennsylvania
No Drawing. Filed Apr. 7, 1966, Ser. No. 540,829
Int. Cl. C08g 33/20, 33/16
U.S. Cl. 260—2      9 Claims

ABSTRACT OF THE DISCLOSURE

Process for preparing titanyl phosphinate polymers by reacting titanium tetrachloride with a phosphinic acid ester to obtain an adduct, heating the adduct to obtain an intermediate polymer, and thereafter hydrolyzing the intermediate polymer to the product polymer. The invention also embodies as a composition, a $TiCl_4$ adduct with phosphinic acid esters and also a polymeric intermediate structure $TiCl_2(OPR'R''O)_2$ where $R'$ and $R''$ are alkyl, aryl, alkaryl, or aralkyl containing up to 10 carbon atoms.

---

Titanyl phosphinate polymers of the type described in British specification No. 975,460 are thermally and hydrolytically stable and heretofore have been prepared by reaction of a tetra-alkyl, -aryl, -alkaryl or -aralkyl titanate with a diorganophosphinic acid, and thereafter polymerizing the monomeric compound first formed. A major difficulty with such a procedure is that it requires the use of expensive especially prepared tetraorgano-substituted titanium compounds. In contrast, we have now found a process whereby low cost, easily available titanium tetrachloride may be used in conjunction with a substituted phosphinate ester and whereby the titanyl phosphinate polymers are obtained readily in good yield. The process of the invention involves three distinct steps portrayed by the following equations:

(a) $TiCl_4 + 2R'R''P(O)(OR''') \rightarrow TiCl_4 \cdot 2R'R''P(O)(OR''')$ (b)
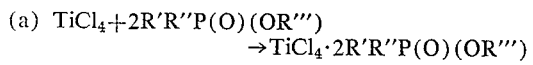

(c) $TiCl_2(OPR'R''O)_2 + H_2O \rightarrow \text{[}TiO(OPR'R''O)_2\text{]} + 2HCl$ In the first step of the process titanium tetrachloride forms an adduct with an ester of a phosphinic acid, the ester being indicated in the above equation where $R'$, $R''$ and $R'''$ are alkyl, aryl, alkaryl, or aralkyl groups, preferably containing up to ten carbon atoms. This first step of the process goes readily at room temperature, but may be carried out at temperatures between about 0° C. and about 100° C. It will be understood that due to the water sensitivity of $TiCl_4$ this step is carried out in an anhydrous system. The adduct thus obtained in step (a) is quantitatively decomposed by heat (generally at about 150° to about 250° C. or higher) to $R'''Cl$ and a dichlorotitanium diphosphinate. This latter compound is then hydrolyzed with water as shown in step (c) to the phosphinate polymer.

In the first step wherein the adduct is formed, a solution of titanium tetrachloride in a solvent (e.g., an aromatic solvent such as benzene, toluene, xylene, etc) is added to a solution of the phosphinic acid ester in a similar solvent system. The novel adduct which has the empirical formula $TiCl_4 \cdot 2R'R''P(O)(OR''')$ where $R'$, $R''$ and $R'''$ are defined above is filtered off and used in the next step of the process where it is heated with or without a solvent and preferably under vacuum conditions to remove the volatile chloride ($R'''Cl$) formed. When a solvent is used as a vehicle for the heating step any one of the numerous inert solvents having a boiling point of at least about 160° C. is suitable, e.g., chlorinated polyphenyls, o-dichlorobenzene, heavy aromatic naphtha, dipentene, pine oil, high flash mineral spirits, and the like. The product of this heating step is a novel compound, polymeric in nature, and characterized by having a repeating unit of formula $TiCl_2(OPR'R''O)_2$ which may be characterized as

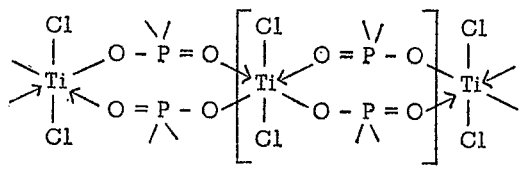

This product is used in the final hydrolysis step leading to the desired polymer product. The hydrolysis is readily carried out in boiling water and the product polymer purified by extraction with a solvent such as an alcohol (methanol, ethanol) or other solvent in which only the starting materials are soluble. The desired polymer product is soluble in $CHCl_3$ or other chlorinated solvents.

In order to more effectively illustrate the invention, the following examples are given:

Example 1.—Preparation of $TiCl_4 \cdot 2(C_6H_5)_2P(O)OC_2H_5$

A solution of 17.198 g. (0.091 mole) of freshly distilled $TiCl_4$ in 150 ml. of benzene was added to a stirred solution of 44.738 g. (0.182 mole) of ethyl diphenylphosphinate in 200 ml. of benzene. The yellow adduct was filtered off, washed with benzene, and dried overnight in vacuo. The yellow product, M.P. 158–159° C., is soluble in chloroform and acetone, but insoluble in petroleum ether and cyclohexane; yield 68%.

*Analysis.*—Calculated for $C_{28}H_{30}Cl_4O_4P_2Ti$: C, 49.29; H, 4.43; P, 9.08; Cl, 20.79; Ti, 7.02. Found: C, 49.56; H, 4.47; P, 8.85; Cl, 20.72; Ti, 7.18. Calculated formula wt., 682.2; mol. wt. found, 660.

Example 2.—Preparation of $\text{[}TiCl_2[OP(C_6H_5)_2O]_2\text{]}$

A sample of $TiCl_4 \cdot 2(C_6H_5)_2P(O)(OC_2H_5)$ was heated with agitation to 160–175° C. at which temperature the evolution of $C_2H_5Cl$ proceeded quite readily. Heating was continued in vacuo for about 20 hr. at 180° C. to complete the reaction. The pale yellow product is readily soluble in chloroform and benzene and does not melt below 300° C.

*Analysis.*—Calculated for $C_{24}H_{20}Cl_2O_4P_2Ti$: C, 52.11; H, 3.64; P, 11.20; Cl, 12.82; Ti, 8.66. Found: C, 52.40; H, 3.98; P, 11.18; Cl, 12.70; Ti, 8.9. Calculated formula weight for the repeating unit is 553.2; molecular weight found, >10,000 by vapor pressure osmometry.

Example 3.—Hydrolysis of $\text{[}TiCl_2[OP(C_6H_5)_2O]_2\text{]}$

Approximately 6.41 g. of the intermediate polymer $\text{[}TiCl_2[OP(C_6H_5)_2O]_2\text{]}$ was suspended in boiling water until no further liberation of chloride ions could be detected (10 hr.). Upon extraction with 95% ethanol, drying and recovery from chloroform, 4.51 g. (78.5% yield) of light brown product was obtained.

*Analysis.*—Calculated for $C_{24}H_{20}O_5P_2Ti$: C, 57.85; H, 4.05; P, 12.44; Ti, 9.61. Found: C, 57.03; H, 4.28; P, 11.67; Ti, 9.51. Calculated formula weight 498.3; mol weight found >10,000 by vapor pressure osmometry.

Example 4

The adduct $TiCl_4 \cdot 2[CH_3(CH_3C_6H_4)P(O)OC_2H_5]$ was prepared from $TiCl_4$ and $CH_3(CH_3C_6H_4)P(O)OC_2H_5$ using ortho-dichlorobenzene as a solvent. Upon heating to reflux C₂H₅Cl was evolved. The intermediate polymer with repeating unit TiCl₂[OP(CH₃)(CH₃C₆H₄)O]₂ was precipitated with petroleum ether and collected. Hydrolysis was carried out in boiling water until no more chloride ions were liberated. The resulting Ti(O)[OP(CH₃)(CH₃C₆H₄)O]₂ polymer was dissolved in chloroform, filtered from a small amount of insolubles, and recovered on the steam bath.

Example 5

Similarly, the adduct

TiCl₄·2(3—CH₃C₆H₄CH₂)₂P(O)(OC₄H₉)

was synthesized from TiCl₄ and (3—CH₃C₆H₄CH₂)₂P(O)OC₄H₉ in tetrachloroethane. The product was subsequently decomposed by fusion forming the intermediate polymer ҢTiCl₂[OP(3—CH₃C₆H₄CH₂)₂O]₂Ң. When suspended in hot water, the latter was hydrolyzed to ҢTiO[OP(3—CH₃C₆H₄CH₂)₂O]₂Ң

Example 6

Mixing stoichiometric amounts of TiCl₄ and (C₈H₁₇)₂P(O)OC₃H₇ in benzene resulted in the formation of

TiCl₄·2(C₈H₁₇)₂P(O)(OC₃H₇)

This compound was suspended in a polychlorinated biphenyl (Arochlor 1254) and heated to about 170° C. causing it to decompose to the intermediate polymer ҢTiCl₂[OP(C₈H₁₇)₂O]₂Ң and C₃H₇Cl. The former was suspended in boiling water for 12 hr. to yield the polymer product ҢTiO[OP(C₈H₁₇)₂O]₂Ң

It will be understood that numerous changes and variations may be made from the above described invention without departing from its spirit and scope.

We claim:
1. A process for the preparation of titanyl phosphinate polymers having the repeating unit Ti(O)(OPR′R″O)₂ which comprises reacting titanium tetrachloride with a phosphinic acid ester of structure R′R″P(O)(OR‴) where R′, R″, and R‴ are selected from the group consisting of alkyl, aryl, aralkyl, and alkaryl groups containing up to ten carbon atoms, whereby an adduct is formed, heating the adduct to generate a polymeric compound of structure TiCl₂(OPR′R″O)₂ and hydrolyzing this compound to the desired polymer.

2. A process as in claim 1 where the phosphinic acid ester is ethyl diphenylphosphinate.
3. The process of claim 1 where the phosphinic acid ester is CH₃(CH₃C₆H₄)P(O)OC₂H₅.
4. The process of claim 1 where the phosphinic acid ester is (3—CH₃C₆H₄CH₂)₂P(O)OC₄H₉.
5. The process of claim 1 where the phosphinic acid ester is (C₈H₁₇)₂P(O)OC₃H₇.
6. A compound having the formula TiCl₄·2R′R″P(O)(OR‴)

where R′, R″ and R‴ are selected from the group consisting of alkyl, aryl, aralkyl and alkaryl containing up to ten carbon atoms.
7. A compound as in claim 6 where R′ and R″ are phenyl and R‴ is ethyl.
8. A polymer of the repeating unit TiCl₂(OPR′R″O)₂ where R′ and R″ are selected from the group consisting of alkyl, aryl, aralkyl and alkaryl containing up to ten carbon atoms.
9. A polymer as in claim 8 where R′ and R″ are phenyl.

References Cited

UNITED STATES PATENTS 2,512,063   6/1950   Kreidl et al. _____ 260—2

FOREIGN PATENTS 975,460   11/1964   Great Britain.
1,018,456   1/1966   Great Britain.

OTHER REFERENCES

Andrianov et al.: "Izvestia Akad. Nauk. USSR," April 1964, pp. 651–656.

Feld.: "Jour. Chem. Soc.," London, October 1964, pp. 3963–3965.

SAMUEL H. BLECH, Primary Examiner

U.S. Cl. X.R.

260—33.6, 33.8, 429.5